Jan. 13, 1970   J. C. FREEBORN   3,489,955
AMPLIFIER APPARATUS
Filed Sept. 13, 1967

INVENTOR.
JOHN C. FREEBORN
BY Bruce C Lutz

ATTORNEY

United States Patent Office 3,489,955
Patented Jan. 13, 1970

3,489,955
AMPLIFIER APPARATUS
John C. Freeborn, West Covina, Calif., assignor to Honeywell Inc., Minneapolis, Minn., a corporation of Delaware
Filed Sept. 13, 1967, Ser. No. 667,491
Int. Cl. H01b *47/00;* G01r *33/14;* H03f *3/68*
U.S. Cl. 317—123                                6 Claims

ABSTRACT OF THE DISCLOSURE

A circuit utilizing in one embodiment a differential amplifier for sensing the voltage drop of the resistive component of an inductive load and supplying a feedback potential of a polarity and magnitude to cancel the resistive component voltage drop in the load.

---

The present invention is related generally to electronic circuitry and more specifically to a circuit which may be utilized in two different ways. The first way is to supply a constant voltage to an input terminal of the circuit which has an inductor connected as the load, and an output signal will be obtained which is indicative of the reactive impedance component of the inductor at any given instant. The circuit is also useful for keeping the flux rate of change substantially directly proportional to the input voltage rather than non-linearly proportional as is the case in the prior art.

As implied above, the design of prior art circuitry, especially in high fidelity applications, was not good enough to obtain a linear output from an inductive circuit in response to a linear input. The present invention on the other hand eliminates the resistive effect of an inductor and produces through feedback techniques a rate of change of flux which is directly proportional to an input voltage.

The prior art has utilized means comprising an alternating input to provide a rough indication of the instantaneous impedance of an inductor for the purpose of tracing the B-H curve. The present invention, however, provides a continuously varying output signal which may be supplied to a recorder to provide a curve directly representative of the magnetic characteristics of an inductive core.

It is, therefore, an object of the present invention to provide improved circuitry utilizing reactive impedances.

Figure 1:
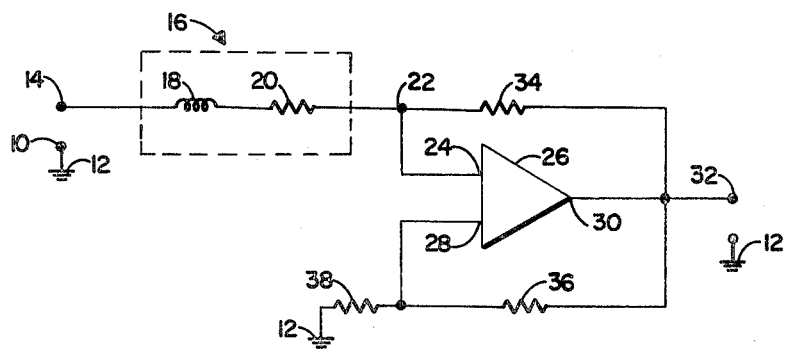
Figure 2:
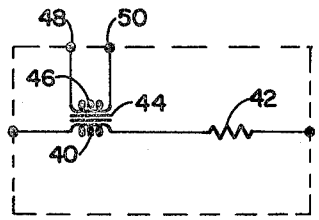

Further objects and advantages of the present invention may be ascertained from a reading of the specification and appended claims in conjunction with the drawings wherein:

FIGURE 1 is a schematic of the circuit of an embodiment of the present invention; and FIGURE 2 is representative of an insert which may be made in FIGURE 1 when a transformer output is desired which is directly representative of an input voltage.

A first input terminal 10 is connected to ground or reference potential 12. A second input terminal means 14 is connected to one input or side of a dash line block generally designated as 16 and internally in block 16 a connection is made through a winding 18 and a resistance 20 to the other side of block 16. The block 16 represents an inductive element or any other reactive device wherein inductive component 18 is the reactive portion of the device 16 and component 20 is the resistive portion. The output of block 16 is connected to a junction point 22 which is connected to a first or inverting input 24 of a differential amplifying means 26 having a non-inverting second input 28 and an output means 30. Output means 30 of amplifier 26 is connected to an output terminal 32 which provides an output with respect to ground 12. A first resistive feedback means 34 is connected between output 32 and junction point 22. A resistor means 36 is connected between output 32 and input 28 of amplifier 26. A further resistor means 38 is connected between input 28 and ground 12. The resistors 36 and 38 comprise a voltage dividing means and provide voltage feedback to amplifier 26 while resistor 34 either alone or in combination with resistive component 20 provides current feedback to input 24 of amplifier 26.

In FIGURE 2 a dashed line block is utilized to illustrate that the component is directly replaceable in FIGURE 1 for block 16. An input corresponding to the one connected to terminal 14 is connected to an inductive winding 40 which in turn is connected to a resistive component 42. The other end of resistive component 42 is connected to the output of the dashed line block and corresponds to the terminal of FIGURE 1 which is connected to juncture point 22. Winding 40 is wound around a transformer core 44 which has a second winding 46 having output terminals 48 and 50. The terminals 48 and 50 have no correspondence in FIGURE 1.

In describing the operation of the circuit, the voltages at points 14, 24, 28 and 32 with respect to ground will be given respective designations of $E_{14}$, $E_{24}$, $E_{28}$ and $E_{32}$. The amplifier will be assumed to have a very high gain in an open loop condition and all of the resistors will be assumed to be the same value. It will be later realized that either the pairs of resistors of 20 and 34 or 38 and 36 or the alternate pairs 20 and 38 along with 34 and 36 may be incorporated in the invention so that both resistors of a pair are equal although the resistance of one pair of resistors need not be equal to that of another pair. The term $d\phi/dt$ is utilized to denote the rate of flux change in webers per second while $Nd\phi/dt$ is utilized to define the back EMF of the inductor 18. As will be realized, N indicates the number of turns of the winding of inductor 18. Further, as previously indicated, the resistance component 20 is representative of the resistance of the winding of block 16.

In the prior art, when a voltage was impressed across an iron core inductor, the core would change magnetic state at a rate controlled by the following equation having reference to the designations in FIGURE 1.

(1) $$E_{14}=R_{20}I_{20}+Nd\phi/dt$$

where the voltage $E_{14}$ is applied across the inductor 16 and the current $I_{20}$ is the current through the series connection of the inductor 18 and the resistance element 20. As is well known by those skilled in the art, any variations in the resistance of component 20 or the current, $I_{20}$, through it will affect the rate of change of flux in the inductor 18.

The circuit of FIGURE 1 may find one use as a timing circuit. In the prior art, the approach is generally to control the voltage across the winding such as block 16 and by inductor design keep both $R_{20}$ and $I_{20}$ at a minimum thereby minimizing the effects of variations in $I_{20}$. This is accomplished by keeping the core in a saturated condition and then reversing the polarity of the voltage for a time sufficient to provide a given volt-second energy product to drive the core toward saturation by a given amount in the opposite direction. The polarity of the input voltage is again reversed and made only slightly above ground potential. The volt-second product during which the core returns to its previous saturated condition will be substantially equal to the previous volt-second product, except for problems generated by the resistance 20 so that there is a long time period before the core saturates and provides a large increase in current.

Two of the problems inherent with the last described approach are that $I_{20}$ is a parameter which varies with the iron characteristics as well as temperature and is very difficult to predict, and further the change of current $I_{20}$, near saturation, becomes very small when a small voltage is used during the timing operation, thus limiting the maximum time interval obtainable with any given inductor.

By the present circuit, the effect of the resistive component $R_{20}$ is substantially eliminated and thus the rate of change of flux $d\phi/dt$ in the inductive component 18 is directly proportional to the input voltage $E_{14}$.

This will be set forth in the following equations.

(2) $\qquad E_{28} = \frac{1}{2} E_{32}$ (since $R_{36} = R_{38}$).

(3) $\qquad E_{24} = I_{34} R_{34}$ (assuming substantially infinite impedance at the input of amplifier 26)

(4) $\qquad E_{28} \cong E_{24}$ (as long as amplifier 26 is in an unsaturated condition)

(5) $\qquad E_{14} - E_{32} = N d\phi/dt + I_{20} R_{20} + I_{34} R_{34}$

Since it was assumed that the input impedance of amplifier 26 is substantially infinite, it will be realized that $I_{20} = I_{34}$. Combining Equations 2, 3 and 4 and solving for $E_{32}$ gives (6) $\qquad \frac{1}{2} E_{32} = E_{32} + I_{20} R_{34}$ thus (7) $\qquad -\frac{1}{2} E_{32} = I_{20} R_{34}$ and (8) $\qquad E_{32} = -2 I_{20} R_{34}$ if Equation 8 is substituted into Equation 5 under the previous assumptions that $R_{20}$ and $R_{34}$ are equal;

(9) $\qquad E_{14} + 2 I_{20} R_{20} N d\phi/dt + 2 I_{20} R_{34}$ and

(10) $\qquad E_{14} = N d\phi/dt$

While the above Equation 9 is not strictly true, since in Equation 4 $E_{24}$ is merely similar to $E_{28}$ and not exactly equal as assumed in the remaining equations, with a high-gain amplifier this assumption produces only a very minor error and is an insignificant quantity in Equation 9. For this reason the minor error quantity has been eliminated from consideration in the equations.

The approach outlined in the equations above not only assures that $d\phi/dt$ will at all times be proportional to $E_{14}$ regardless of any magnitude or variation of $I_{20}$, but it also provides a large saturation indication with a very small $E_{14}$ because as $I_{20}$ increases, $E_{32}$ also increases until a stable condition is reached, at which time $N d\phi/dt$ equals zero and $E_{32}$ equals the saturation limit of the operational amplifier 26.

Variations of resistance of $R_{20}$ due to temperature can be compensated for in $R_{34}$ by using a temperature sensitive resistor having the same temperature coefficient of resistance as that of the resistance component 20 of the inductive winding 16.

When the circuit of FIGURE 1 is used as a timing circuit, as previously indicated, one description of operation would be as follows. A positive voltage is applied at terminal 14 with respect to terminal 10 to saturate the inductive component 18 of inductor 16 and place input 24 at a positive potential with respect to terminal 28. Since it was previously indicated that terminal 24 is an inverting input, the output 32 will be a large negative voltage thus keeping input 28 negative. The input potential at terminal 14 is then made negative for a predetermined volt second product. The negative voltage applied to terminal 14 will produce a negative input at input 24 with respect to input 28 and thus produce a positive output potential at output 32. In most instances, this negative voltage, which is merely used to preset the core, is of a large magnitude and a short duration. The voltage at terminal 14 is then again made positive but of a very small magnitude. This again changes the polarity at the input of amplifier 26 so that input 24 is positive with respect to input 28. Thus, a negative output at terminal 32 is obtained. The magnitude of the negative output at terminal 32 will seek the level at which the negative potential of input point 24 essentially matches the input potential of point 28. By the resistor symmetry it can be seen that the imagined junction between reactive component 18 and resistive component 20 of inductive element 16 will be maintained at zero potential.

As will be realized by those skilled in the art, $E_{32}$ is representative of the magnetic characteristic curve of inductor 18. Thus, if $E_{32}$ is connected to drive some type of recorder, a tracing may be obtained of the inductive characteristics of the inductive component 18 of inductor 16. While this has previously been done in a crude manner by the use of an alternating voltage, the present method produces a much more accurate indication of the core characteristics.

Another use for the circuit is with the substitution of FIGURE 2 in FIGURE 1. Since the equations illustrated that the change of flux in the winding is directly proportional to the input voltage, it will be apparent that the device could be used to replace the presently used heavy transformers of high fidelity circuits. The reason for the use of a heavy transformer is so that operation may be obtained in the substantially linear center portion of a hysteresis curve. However, the present invention eliminates the non-linearities in operation with a core until saturation of the amplifier 26 occurs, since the circuit is designed to keep the change of flux in the core, such as 44, occurring at a rate directly proportional to the input voltage $E_{14}$.

Other uses such as using the inductor 16 directly as a speaker winding driven from an amplifier will occur to those skilled in the art and I do not wish to be limited by the illustrative embodiments described in the specification.

I claim:

1. Apparatus of the class described comprising, in combination:
   means, including first and second input means and output means, for providing a variable output indicative of the magnitude and relative polarity between said first and second inputs due to signals applied thereto;
   reference potential means;
   voltage dividing means connected between said output means and said reference potential means and providing an intermediate output to said first input means;
   feedback means connected between said output means and said second input means;
   apparatus input means for supplying a voltage signal; and
   load means including reactive and resistive components connected between said apparatus input means and said second input means, said first named means maintaining a junction between said reactive and resistive components at said reference potential.

2. Apparatus as claimed in claim 1 wherein:
   the first recited means is a differential amplifier; and said load means is an inductor wherein the flux rate of change is proportional to the voltage signal.

3. Apparatus as claimed in claim 2 wherein the feedback means comprises a resistor of the same magnitude as said resistive component.

4. Apparatus of the class described comprising, in combination:
   inductor means including a winding having inductive and resistive components;
   means for supplying an input first signal of a given polarity to one end of said winding; and
   differential amplifier means for supplying a second signal to the other end of said winding of a polarity opposite said given polarity and of a magnitude having substantially the same ratio with respect to said input signal as the impedance magnitudes of said resistive to inductive components.

5. Apparatus as claimed in claim 4 wherein the last recited means includes:
   voltage reference means; and
   said differential amplifier means has current feedback and is connected to said voltage reference means for receiving therefrom a voltage substantially equal in magnitude to said second signal.

6. The method of linearizing the flux rate of change, with respect to an input voltage $V_1$, of an inductive device having at least one winding with first and second ends and having inductive $Z_L$ and resistive $Z_R$ components, comprising the steps of:
   applying the input voltage $V_1$ to the first end of the input winding;
   detecting the resistive component $Z_R$ voltage drop through the winding; and
   applying a feedback voltage $V_2$, to the second end of the winding, having a polarity opposite the input voltage $V_1$ and having a magnitude $V_2 = V_1 (Z_R/Z_L)$ to cancel the effect of the resistive component $Z_R$ voltage drop.

References Cited

UNITED STATES PATENTS

| | | | |
|---|---|---|---|
| 3,229,184 | 1/1966 | Churchill | 321—10 |
| 3,412,342 | 11/1968 | Tonnessen | 330—104 X |

FOREIGN PATENTS 910,427  7/1949  Germany.

OTHER REFERENCES

Audio Engineering, "A New Approach to Loudspeaker Damping," vol. 35, issue 8, pp. 20–22, August 1951.

LEE T. HIX, Primary Examiner

W. H. BEHA, Jr., Assistant Examiner

U.S. Cl. X.R.

179—1; 324—40; 330—104